US012055556B2

(12) United States Patent
Ueda et al.

(10) Patent No.: US 12,055,556 B2
(45) Date of Patent: Aug. 6, 2024

(54) MANIPULATION SYSTEM AND DRIVING METHOD OF MANIPULATION SYSTEM

(71) Applicant: NSK LTD., Tokyo (JP)

(72) Inventors: Hiroki Ueda, Kanagawa (JP); Manabu Kishida, Kanagawa (JP); Nobuaki Takana, Kanagawa (JP)

(73) Assignee: NSK LTD., Tokyo (JP)

( * ) Notice: Subject to any disclaimer, the term of this patent is extended or adjusted under 35 U.S.C. 154(b) by 829 days.

(21) Appl. No.: 17/058,431

(22) PCT Filed: May 27, 2019

(86) PCT No.: PCT/JP2019/020857
§ 371 (c)(1),
(2) Date: Nov. 24, 2020

(87) PCT Pub. No.: WO2019/230635
PCT Pub. Date: Dec. 5, 2019

(65) Prior Publication Data
US 2021/0215727 A1 Jul. 15, 2021

(30) Foreign Application Priority Data
Jun. 1, 2018 (JP) ................................ 2018-106391

(51) Int. Cl.
*B25J 7/00* (2006.01)
*C12M 1/00* (2006.01)
(Continued)

(52) U.S. Cl.
CPC ... *G01N 35/0099* (2013.01); *G01N 35/00584* (2013.01); *G01N 35/1065* (2013.01);
(Continued)

(58) Field of Classification Search
CPC ......... G01N 35/0099; G01N 35/00584; G01N 35/1065; G02B 21/26; G02B 21/32; G02B 21/36
See application file for complete search history.

(56) References Cited

U.S. PATENT DOCUMENTS

2013/0023052 A1* 1/2013 Tanaka .................. G02B 21/32
435/461

FOREIGN PATENT DOCUMENTS

| JP | 2001-239500 A | 9/2001 |
|----|----|----|
| JP | 2009-202331 A | 9/2009 |

(Continued)

OTHER PUBLICATIONS

Decision to Grant a Patent dated Nov. 2, 2021 from the Japanese Patent Office in Japanese Application No. 2020-522173.
(Continued)

*Primary Examiner* — Jill A Warden
*Assistant Examiner* — Michael Stanley Gzybowski
(74) *Attorney, Agent, or Firm* — Sughrue Mion, PLLC

(57) ABSTRACT

A manipulation system includes a sample stage configured such that a minute object is placed thereon, a first manipulator including a first pipette for holding the minute object, a second manipulator including a second pipette for manipulating the minute object that is held to the first pipette, an imaging unit configured to image the minute object, and a control unit configured to control the sample stage, the first pipette, the second pipette, and the imaging unit. The control unit moves the second pipette to a direction approaching the sample stage from the upper side of the minute object, at a position where the second pipette overlaps with the minute object and is away from the center of the minute object in a direction orthogonal to the extending direction of the second pipette, when viewed from the direction perpendicular to the sample stage.

4 Claims, 10 Drawing Sheets

(51) Int. Cl.
  *G01N 35/00* (2006.01)
  *G01N 35/10* (2006.01)
  *G02B 21/26* (2006.01)
  *G02B 21/32* (2006.01)
  *G02B 21/36* (2006.01)

(52) U.S. Cl.
  CPC ............ *G02B 21/26* (2013.01); *G02B 21/32* (2013.01); *G02B 21/36* (2013.01)

(56) References Cited

FOREIGN PATENT DOCUMENTS

| | | |
|---|---|---|
| JP | 4838520 B2 | 12/2011 |
| JP | 2013-160960 A | 8/2013 |
| JP | 2017-071020 A | 4/2017 |
| JP | 2017-124452 A | 7/2017 |

OTHER PUBLICATIONS

International Search Report for PCT/JP2019/020857 dated Aug. 20, 2019 [PCT/ISA/210].
Written Opinion for PCT/JP2019/020857 dated Aug. 20, 2019 [PCT/ISA/237].

* cited by examiner

MANIPULATION SYSTEM AND DRIVING METHOD OF MANIPULATION SYSTEM

CROSS REFERENCE TO RELATED APPLICATIONS

This application is a National Stage of International Application No. PCT/JP2019/020857 filed May 27, 2019, claiming priority based on Japanese Patent Application No. 2018-106391 filed Jun. 1, 2018.

FIELD

The present invention relates to a manipulation system and a driving method of the manipulation system.

BACKGROUND

In the field of biotechnology, a micromanipulation system for performing a fine operation on a minute object has been known. In the manipulation system, under microscope observation, by piercing a manipulation pipette into the position of a manipulation target of a minute object while fixing the position of the minute object by a holding pipette for holding the minute object, an injection operation is performed. As a result, the manipulation system performs manipulation such as injecting a DNA solution or cell into a cell or ovum.

Patent Literature 1 discloses a manipulation system that automatically performs injection into a cell (sample). Patent Literature 2 discloses a positioning device that changes the position of a minute object by applying an electric field to the minute object.

CITATION LIST

Patent Literature

Patent Literature 1: Japanese Patent No. 4838520
Patent Literature 2: Japanese Patent Application Laid-open No. 2001-239500

SUMMARY

Technical Problem

When performing injection operations, a high skill of an operator is needed, and the damage of a minute object or variations of operations dependent on the sense of the operator may arise. When performing these operations under automatic control, it is difficult to detect a manipulation target position of the minute object, and piercing the manipulation pipette into the manipulation target position may be difficult.

The micro-manipulator system of Patent Literature 1 performs neither detection of manipulation target position of the minute object nor positioning of the manipulation target position. The positioning device of Patent Literature 2 needs to additionally provide electrodes and a control device for generating the electric field and that may make it difficult to secure workspace.

The present invention has been made in view of the above-described problems and provides a manipulation system capable of detecting a manipulation target position of a minute object in a simple configuration and a driving method of the manipulation system.

Solution to Problem

To achieve the above object, A manipulation system according to an aspect of the present invention comprising: a sample stage configured such that a minute object is placed thereon; a first manipulator including a first pipette for holding the minute object; a second manipulator including a second pipette for manipulating the minute object that is held to the first pipette; an imaging unit configured to image the minute object; and a control unit configured to control the sample stage, the first pipette, the second pipette, and the imaging unit, wherein the control unit moves the second pipette to a direction approaching the sample stage from an upper side of the minute object, at a position where the second pipette overlaps with the minute object and is away from a center of the minute object in a direction orthogonal to an extending direction of the second pipette, when viewed from a direction perpendicular to the sample stage.

According to this, as the second pipette moves in the height direction and makes contact with the minute object, the minute object rotates. Thus, even when the manipulation target position is not detected, the manipulation system can detect the manipulation target position by performing the rotation operation of the minute object and changing the manipulation target position. In addition, because the rotation operation can be performed by the second pipette, the manipulation system has no need for a dedicated device for the rotation operation of the minute object. As a result, the manipulation system can detect the manipulation target position of the minute object in a simple configuration.

As a preferable aspect of the manipulation system, a tip of the second pipette is arranged between the minute object and the first pipette, the minute object is disposed between the tip of the second pipette and an end of the second pipette, the end being opposite to the tip of the second pipette, and a shaft portion of the second pipette is in contact with the minute object, when viewed from the direction perpendicular to the sample stage. According to this, in the rotation operation of the minute object, the tip of the second pipette does not come in contact with the minute object. Thus, the manipulation system can prevent the damage of the minute object and the damage of the second pipette.

As a preferable aspect of the manipulation system, the control unit detects a manipulation target position of the minute object based on image data of the imaging unit, moves the second pipette to the manipulation target position, and causes the second pipette to perform manipulation for the minute object. According to this, because the control unit detects the manipulation target position based on the image data, the manipulation target position can be detected regardless of the degree of skill of the operator. Furthermore, because the detection of the manipulation target position and the manipulation for the minute object are performed by the control unit automatically, the manipulation system can manipulate the minute object efficiently and suitably.

As a preferable aspect of the manipulation system, the control unit operates the first pipette in a height direction, and based on a plurality of image data of the minute object imaged for each different height position, detects the manipulation target position of the minute object. As a result, the manipulation system can accurately detect the manipulation target position.

A driving method according to an aspect of the present invention of a manipulation system that includes a sample stage configured such that a minute object is placed thereon, a first manipulator including a first pipette for holding the minute object, a second manipulator including a second pipette for manipulating the minute object that is held to the first pipette, an imaging unit configured to image the minute object, and a control unit configured to control the sample stage, the first pipette, the second pipette, and the imaging unit, the driving method comprising: a detection step in which the control unit detects a manipulation target position of the minute object that is held to the first pipette based on image data of the imaging unit; and a rotation step in which, when the manipulation target position is not detected at the detection step, the control unit moves the second pipette to a direction approaching the sample stage from an upper side of the minute object, at a position where the second pipette overlaps with the minute object and is away from a center of the minute object in a direction orthogonal to an extending direction of the second pipette, when viewed from a direction perpendicular to the sample stage.

According to this, as the second pipette moves in the height direction and makes contact with the minute object, the minute object rotates. Thus, even when the manipulation target position is not detected, the driving method of the manipulation system can detect the manipulation target position by performing the rotation operation of the minute object and changing the manipulation target position. In addition, because the rotation operation can be performed by the second pipette, the driving method of the manipulation system has no need for a dedicated device for the rotation operation. As a result, the driving method of the manipulation system can detect the manipulation target position of the minute object in a simple configuration.

Advantageous Effects of Invention

According to the present invention, the manipulation target position of the minute object can be detected in a simple configuration.

DESCRIPTION OF EMBODIMENT

The following describes the present invention in detail while referring to the accompanying drawings. Note that the present invention is not intended to be limited by the following mode to implement the invention (hereinafter referred to as an embodiment). The constituent elements in the following embodiment include elements easily achieved by a person skilled in the art, elements being substantially the same, and elements being within a scope of what is called equivalents. Moreover, the constituent elements disclosed in the following embodiment can be combined as appropriate.

Embodiment

Figure 1:
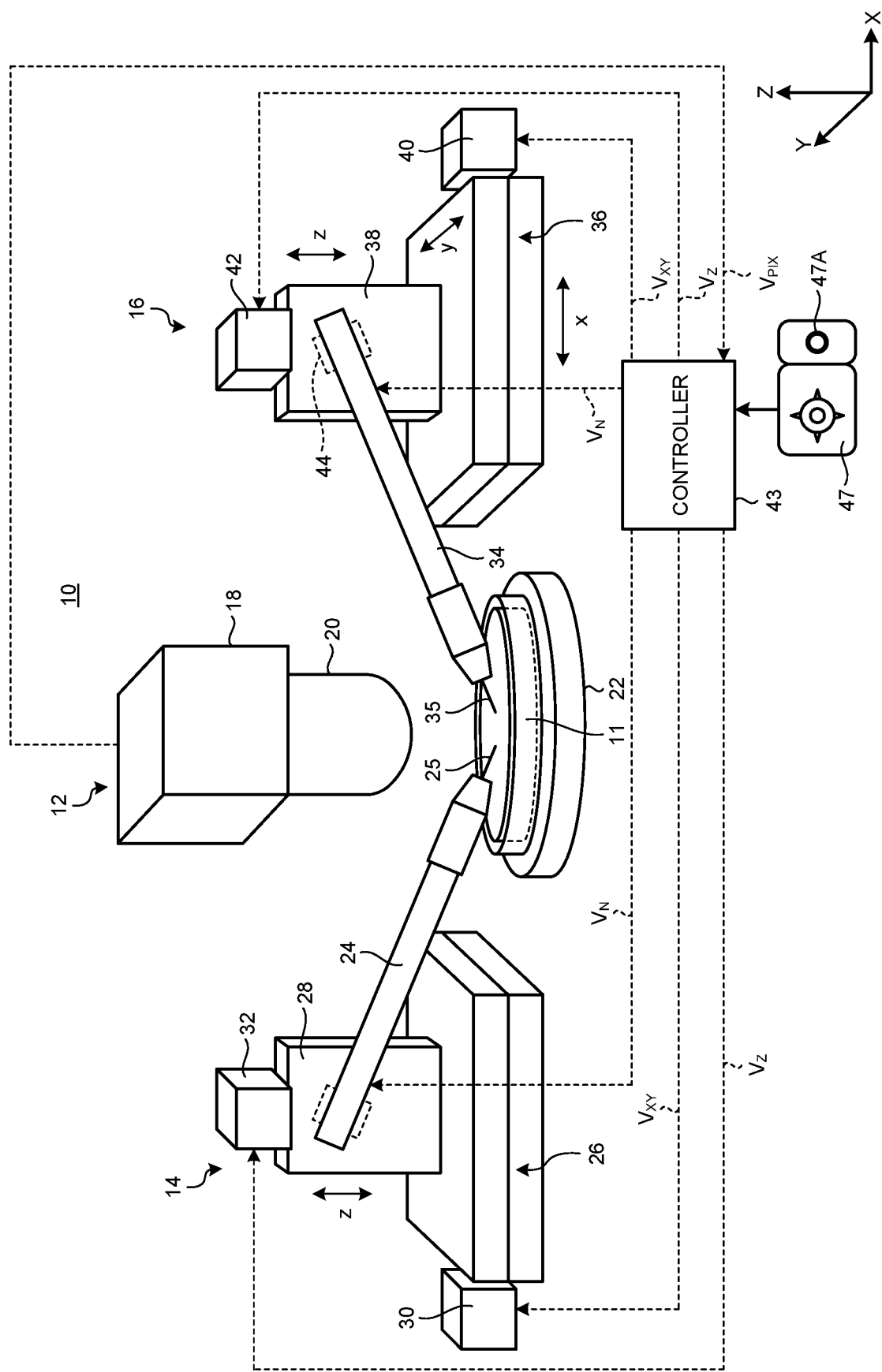
FIG. 1 is a diagram schematically illustrating a configuration of a manipulation system according to an embodiment.

FIG. 1 is a diagram schematically illustrating a configuration of a manipulation system according to the embodiment. A manipulation system 10 is a system to manipulate a sample that is a minute object (a cell or ovum, for example) under microscope observation. As illustrated in FIG. 1, the manipulation system 10 includes a microscope unit 12, a first manipulator 14, a second manipulator 16, and a controller 43 that controls the manipulation system 10. The first manipulator 14 and the second manipulator 16 are separately arranged on both sides of the microscope unit 12.

The microscope unit 12 includes a camera 18 including an imaging element, a microscope 20, and a sample stage 22. The sample stage 22 can support a sample holding member 11 such as a petri dish, and the microscope 20 is arranged directly above the sample holding member 11. The microscope unit 12 has an integral structure of the microscope 20 and the camera 18 and includes a light source (depiction omitted) that emits light toward the sample holding member 11. The camera 18 may be provided separately from the microscope 20.

In the sample holding member 11, a solution containing samples is accommodated. The samples of the sample holding member 11 are irradiated with light and the light reflected by the samples of the sample holding member 11 is incident on the microscope 20. An optical image concerning the samples is magnified by the microscope 20 and thereafter captured by the camera 18. The microscope unit 12 is capable of observing the samples based on the image captured by the camera 18.

As illustrated in FIG. 1, the first manipulator 14 includes a first pipette holding member 24, an X-Y axis table 26, a Z-axis table 28, a drive device 30 that drives the X-Y axis table 26, and a drive device 32 that drives the Z-axis table 28. The first manipulator 14 is a manipulator having a three-axis configuration of an X-axis-Y-axis-Z-axis.

In the present embodiment, it is defined that one direction in a horizontal plane is an X-axis direction, the direction that intersects with the X-axis direction in the horizontal plane is a Y-axis direction, and the direction that intersects with each of the X-axis direction and the Y-axis direction (that is, the vertical direction) is a Z-axis direction. The surface of the sample stage 22 is parallel to an X-Y plane and orthogonal to the Z-axis direction.

The X-Y axis table 26 is, by the drive of the drive device 30, movable in the X-axis direction or the Y-axis direction. The Z-axis table 28 is arranged to be movable vertically on the X-Y axis table 26 and is movable in the Z-axis direction by the drive of the drive device 32. The drive devices 30 and 32 are connected to the controller 43.

The first pipette holding member 24 is coupled to the Z-axis table 28, and a first pipette 25 that is a capillary tip is attached at the tip. The first pipette holding member 24 can move in accordance with the movement of the X-Y axis table 26 and the Z-axis table 28 with three-dimensional space as a moving area. The first pipette holding member 24 can hold the samples accommodated in the sample holding member 11 via the first pipette 25. That is, the first manipulator 14 is a holding manipulator used for holding a minute object, and the first pipette 25 is a holding pipette used as a holding unit of the minute object.

The second manipulator 16 includes a second pipette holding member 34, an X-Y axis table 36, a Z-axis table 38, a drive device 40 that drives the X-Y axis table 36, and a drive device 42 that drives the Z-axis table 38. The second manipulator 16 is a manipulator having a three-axis configuration of an X-axis-Y-axis-Z-axis.

The X-Y axis table 36 is, by the drive of the drive device 40, movable in the X-axis direction or the Y-axis direction. The Z-axis table 38 is arranged to be movable vertically on the X-Y axis table 36 and is movable in the Z-axis direction by the drive of the drive device 42. The drive devices 40 and 42 are connected to the controller 43.

The second pipette holding member 34 is coupled to the Z-axis table 38, and a second pipette 35 made of glass is attached at the tip. The second pipette holding member 34 can move in accordance with the movement of the X-Y axis table 36 and the Z-axis table 38 with three-dimensional space as a moving area. The second pipette holding member 34 can artificially manipulate the samples accommodated in the sample holding member 11. That is, the second manipulator 16 is an operation manipulator used for the manipulation (injection operation of a DNA solution, piercing operation, and the like) of the minute object, and the second pipette 35 is an injection pipette used as an injection operation unit of the minute object.

The X-Y axis table 36 and the Z-axis table 38 are configured as a coarse-motion mechanism (three-dimensional moving table) that coarsely moves the second pipette holding member 34 to a manipulation position of the samples and the like that are accommodated in the sample holding member 11. In addition, at the coupling portion between the Z-axis table 38 and the second pipette holding member 34, a micro-motion mechanism 44 as a nano-positioner is provided. The micro-motion mechanism 44 is configured to support the second pipette holding member 34 movably in the longitudinal direction (axial direction) thereof and also to micro-drive the second pipette holding member 34 along the longitudinal direction (axial direction) thereof.

Figure 2:
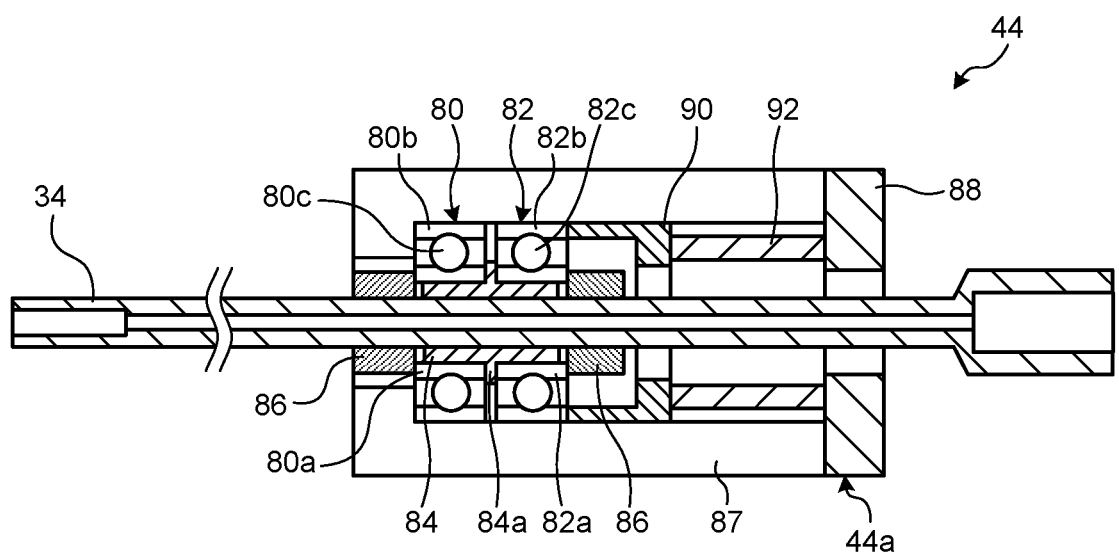
FIG. 2 is a cross-sectional view illustrating one example of a micro-motion mechanism.

FIG. 2 is a cross-sectional view illustrating one example of the micro-motion mechanism. As illustrated in FIG. 2, the micro-motion mechanism 44 includes a piezoelectric actuator 44a that drives the second pipette holding member 34 as a driving object. The piezoelectric actuator 44a includes a cylindrical housing 87, roller bearings 80 and 82 provided in the inside of the housing 87, and a piezoelectric element 92. In the axial direction of the housing 87, the second pipette holding member 34 is inserted. The roller bearings 80 and 82 rotatably support the second pipette holding member 34. The piezoelectric element 92 stretches along the longitudinal direction of the second pipette holding member 34 in accordance with a voltage to be applied. On the tip side (left side in FIG. 2) of the second pipette holding member 34, the second pipette 35 (see FIG. 1) is attached and fixed.

The second pipette holding member 34 is supported by the housing 87 via the roller bearings 80 and 82. The roller bearing 80 includes an inner ring 80a, an outer ring 80b, and balls 80c provided between the inner ring 80a and the outer ring 80b. The roller bearing 82 includes an inner ring 82a, an outer ring 82b, and balls 82c provided between the inner ring 82a and the outer ring 82b. Each of the outer rings 80b and 82b is fixed to the inner circumferential surface of the housing 87, and each of the inner rings 80a and 82a is fixed to the outer circumferential surface of the second pipette holding member 34 via a hollow member 84. As just described, the roller bearings 80 and 82 rotatably support the second pipette holding member 34.

At a substantially central portion in the axial direction of the hollow member 84, a flange portion 84a projecting outward in the radial direction is provided. The roller bearing 80 is arranged on the tip side of the second pipette holding member 34 with respect to the flange portion 84a, and the roller bearing 82 is arranged on the rear end side with respect to the flange portion 84a. Sandwiching the flange portion 84a as an inner ring spacer, the inner ring 80a of the roller bearing 80 and the inner ring 82a of the roller bearing 82 are arranged. The second pipette holding member 34 is threaded on the outer circumferential surface, and locknuts 86 are screwed to the second pipette holding member 34 from the tip side of the inner ring 80a and the rear end side of the inner ring 82a. As a result, the positions in the axial direction of the roller bearings 80 and 82 are fixed.

An annular spacer 90 is arranged on the rear end side in the axial direction of the outer ring 82b coaxially with the roller bearings 80 and 82. On the rear end side in the axial direction of the spacer 90, the annular piezoelectric element 92 is arranged substantially coaxially with the spacer 90. On the further rear end side in the axial direction of the annular piezoelectric element 92, a lid 88 of the housing 87 is arranged. The lid 88 is for fixing the piezoelectric element 92 in the axial direction and has a hole portion through which the second pipette holding member 34 is inserted. The lid 88 may be fastened to the side surface of the housing 87 by bolts not depicted, for example. The piezoelectric element 92 may be in a rod-like or prismatic shape and placed so as to be substantially equal in the circumferential direction of the spacer 90, or may be in a square tube having a hole portion through which the second pipette holding member 34 is inserted.

The piezoelectric element 92 is in contact with the roller bearing 82 via the spacer 90. The piezoelectric element 92 is connected to the controller 43 via lead wires (not depicted). The piezoelectric element 92 is configured to stretch along the axial direction in response to a voltage applied from the controller 43, and finely move the second pipette holding member 34 along the axial direction thereof. When the second pipette holding member 34 finely moves along the axial direction, this fine movement is transmitted to the second pipette 35 (see FIG. 1) and the position of the second pipette 35 is finely adjusted. In addition, when the second pipette holding member 34 vibrates in the axial direction by the piezoelectric element 92, the second pipette 35 also vibrates in the axial direction. As just described, the micro-motion mechanism 44 enables a more accurate operation in manipulating (injection operation of a DNA solution or a cell, piercing operation, and the like) a minute object, and improvement in a piercing action by the piezoelectric element 92 can be achieved.

Although it has been described that the above-described micro-motion mechanism 44 is provided on the second manipulator 16 for manipulating a minute object, the micro-motion mechanism 44 may be provided on the first manipulator 14 for fixing the minute object, or it can also be omitted.

Figure 3:
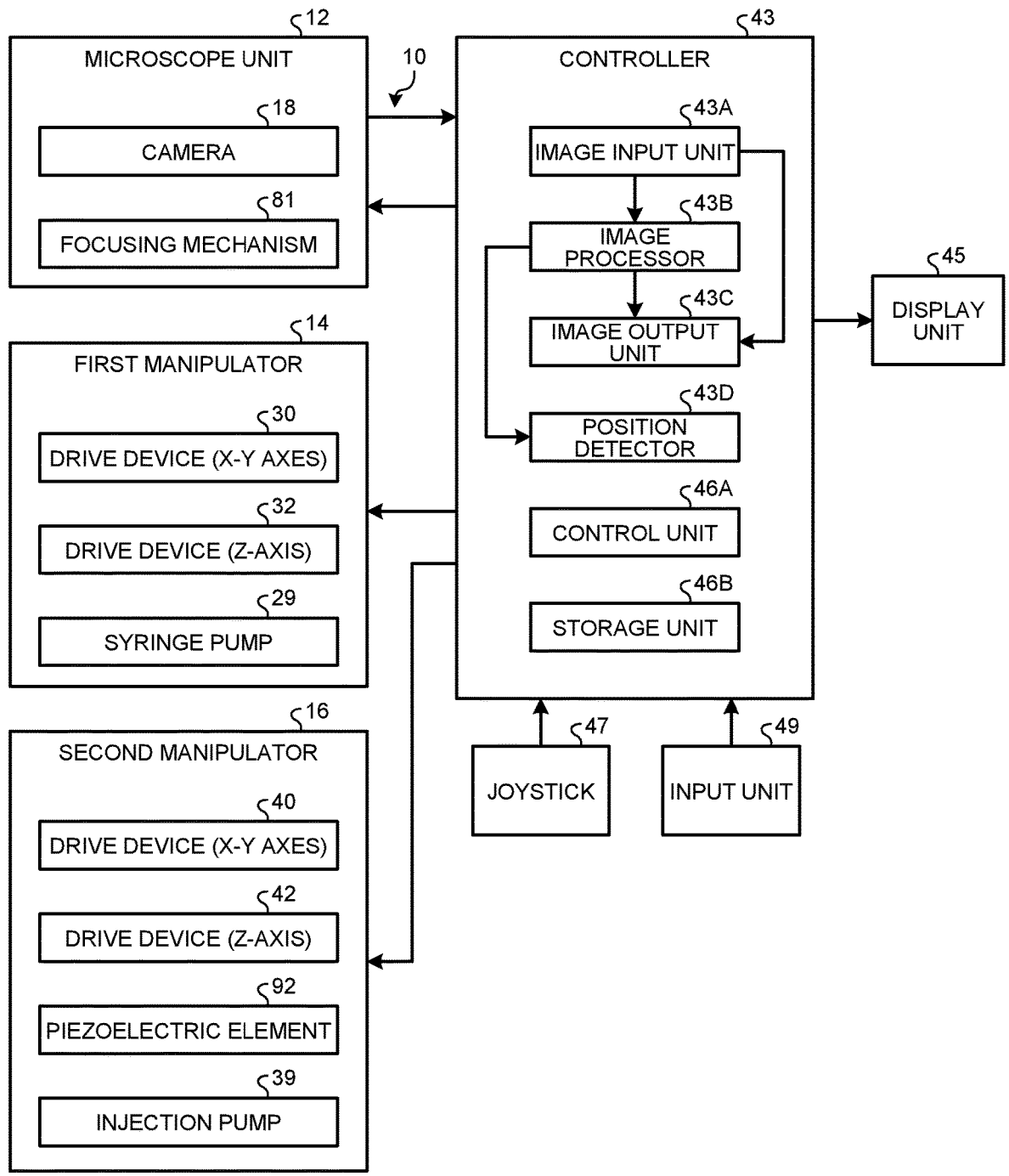
FIG. 3 is a control block diagram of the manipulation system.

Next, the control of the manipulation system 10 performed by the controller 43 will be described with reference to FIG. 3. FIG. 3 is a control block diagram of the manipulation system.

The controller 43 includes hardware resources such as a CPU (central processing unit) as an arithmetic unit, and a hard disk, a RAM (random access memory), and a ROM (read-only memory) as a storage unit. The controller 43 performs various calculations on the basis of a predetermined computer program stored in a storage unit 46B, and in accordance with the calculation result, outputs drive signals so that a control unit 46A performs various controls.

The control unit 46A is a control circuit that controls a focusing mechanism 81 of the microscope unit 12, the drive device 30 and the drive device 32 of the first manipulator 14, a syringe pump 29, the drive device 40 and the drive device 42 of the second manipulator 16, the piezoelectric element 92, and an injection pump 39. The control unit 46A outputs a drive signal to each of the microscope unit 12, the first manipulator 14, and the second manipulator 16 via drivers, amplifiers, and the like provided as needed. The control unit 46A supplies respective drive signals $V_{xy}$ and $V_z$ (see FIG. 1) to the drive devices 30, 32, 40, and 42. The drive devices 30, 32, 40, and 42 drive in the X-Y-Z-axis directions based on the drive signals $V_{xy}$ and $V_z$. The control unit 46A may supply a nano-positioner control signal $V_N$ (see FIG. 1) to the micro-motion mechanism 44 to perform the control of the micro-motion mechanism 44.

The controller 43 is connected to a joystick 47 and an input unit 49 as information input units. The input unit 49 is a keyboard, a touch panel, a mouse, and the like, for example. The controller 43 is further connected to a display unit 45 such as a liquid crystal panel and the like. On the display unit 45, microscope images acquired by the camera 18 and various control screens are displayed. When a touch panel is used as the input unit 49, the touch panel may be used on the display screen of the display unit 45 in an overlapping manner, and an operator may perform an input operation while checking the display image of the display unit 45.

As the joystick 47, a known joystick can be used. The joystick 47 includes a base and a handle portion that stands erect from the base, for example. The joystick 47 can perform X-Y drive of the drive devices 30 and 40 by operating the handle portion to tilt, and by twisting the handle portion, can perform Z-drive of the drive devices 32 and 42. The joystick 47 may include a button 47A for operating each drive of the syringe pump 29, the piezoelectric element 92, and the injection pump 39.

The controller 43 further includes an image input unit 43A, an image processor 43B, an image output unit 43C, and a position detector 43D. An image signal $V_{PIX}$ (see FIG. 1) that the camera 18 imaged through the microscope 20 is input to the image input unit 43A. The image processor 43B receives an image signal from the image input unit 43A and performs image processing. The image output unit 43C outputs image information subjected to the image processing by the image processor 43B to the display unit 45. The position detector 43D can detect, based on the image information after image processing, the position of a cell 100 and the like that is a minute object and the position of a nucleus 100A and the like of the cell 100. The nucleus 100A of the cell 100 is a manipulation target on which an injection operation by the second pipette 35 is performed. The position detector 43D can detect the presence of the cell 100 and the like in the imaging area of the camera 18 based on the image information. In addition, the position detector 43D may detect the positions of the first pipette 25 and the second pipette 35. The image input unit 43A, the image processor 43B, the image output unit 43C, and the position detector 43D are controlled by the control unit 46A.

The image processor 43B performs binarization processing and filter processing on the image signal received from the image input unit 43A, in order to detect the position of the cell 100 and the position of the nucleus 100A of the cell 100, for example. The image processor 43B gray-scales the image signal and, based on a certain threshold value predetermined, converts the grayscale image into a monochrome image. Then, based on the monochrome image obtained by the binarization processing and the filter processing, the image processor 43B performs edge extraction processing and pattern matching. The position detector 43D can, based on the processing result thereof, detect the position of the cell 100 and the position of the nucleus 100A of the cell 100.

The control unit 46A controls, based on the positional information from the position detector 43D and on the information on the presence of the cells and the like, the first manipulator 14 and the second manipulator 16. In the present embodiment, the control unit 46A automatically drives the first manipulator 14 and the second manipulator 16 in a predetermined sequence. Such sequence drive is performed as the control unit 46A outputs the respective drive signals in sequence on the basis of the calculation result of the CPU by a predetermined computer program stored in the storage unit 46B in advance.

Figure 4:
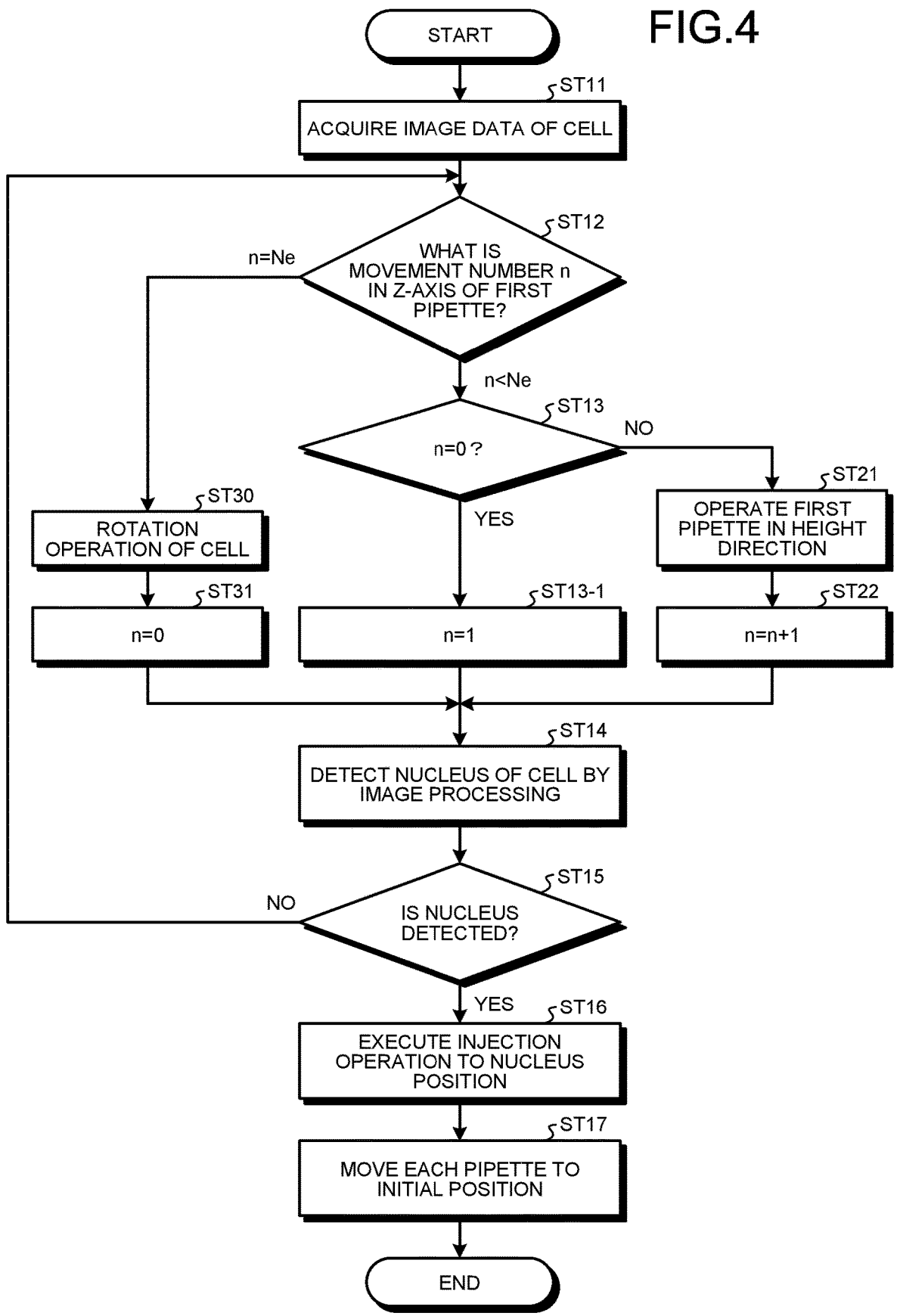
FIG. 4 is a flowchart illustrating a driving method of the manipulation system of the embodiment.
Figure 5:
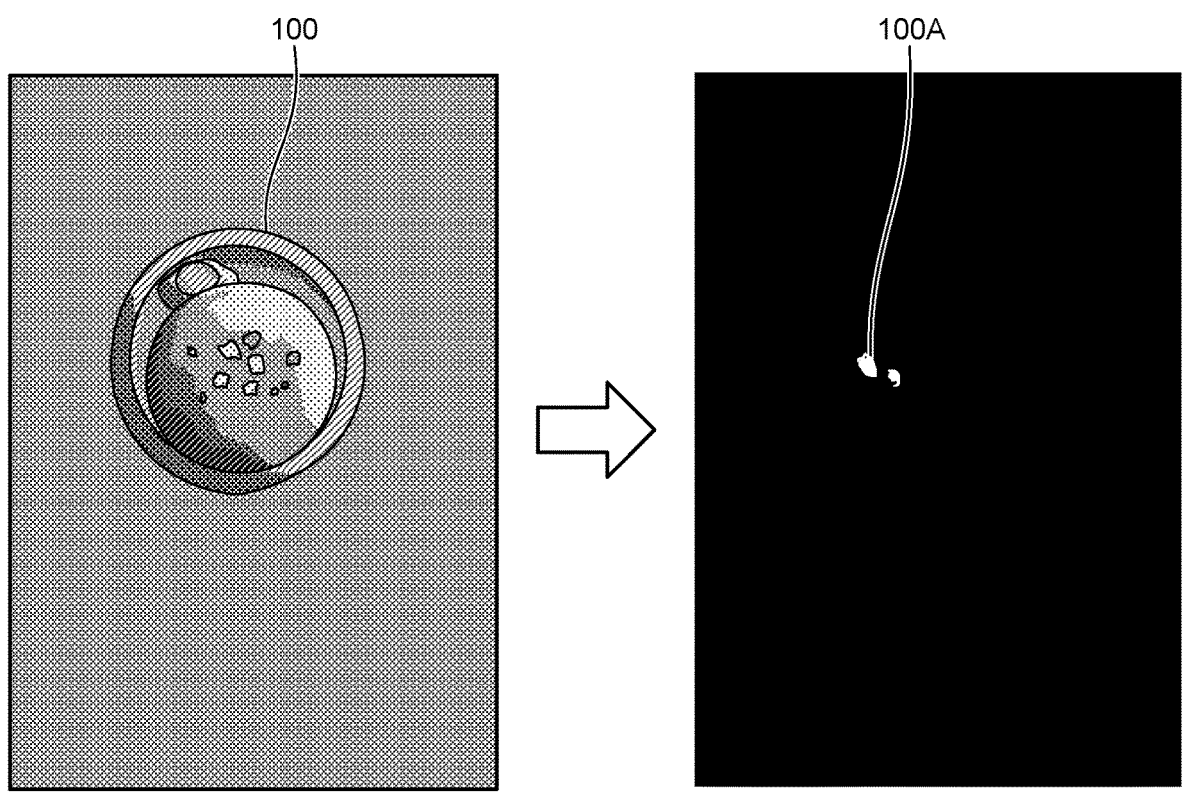
FIG. 5 is a schematic diagram of a cell and nuclei detected by image processing.
Figure 6:
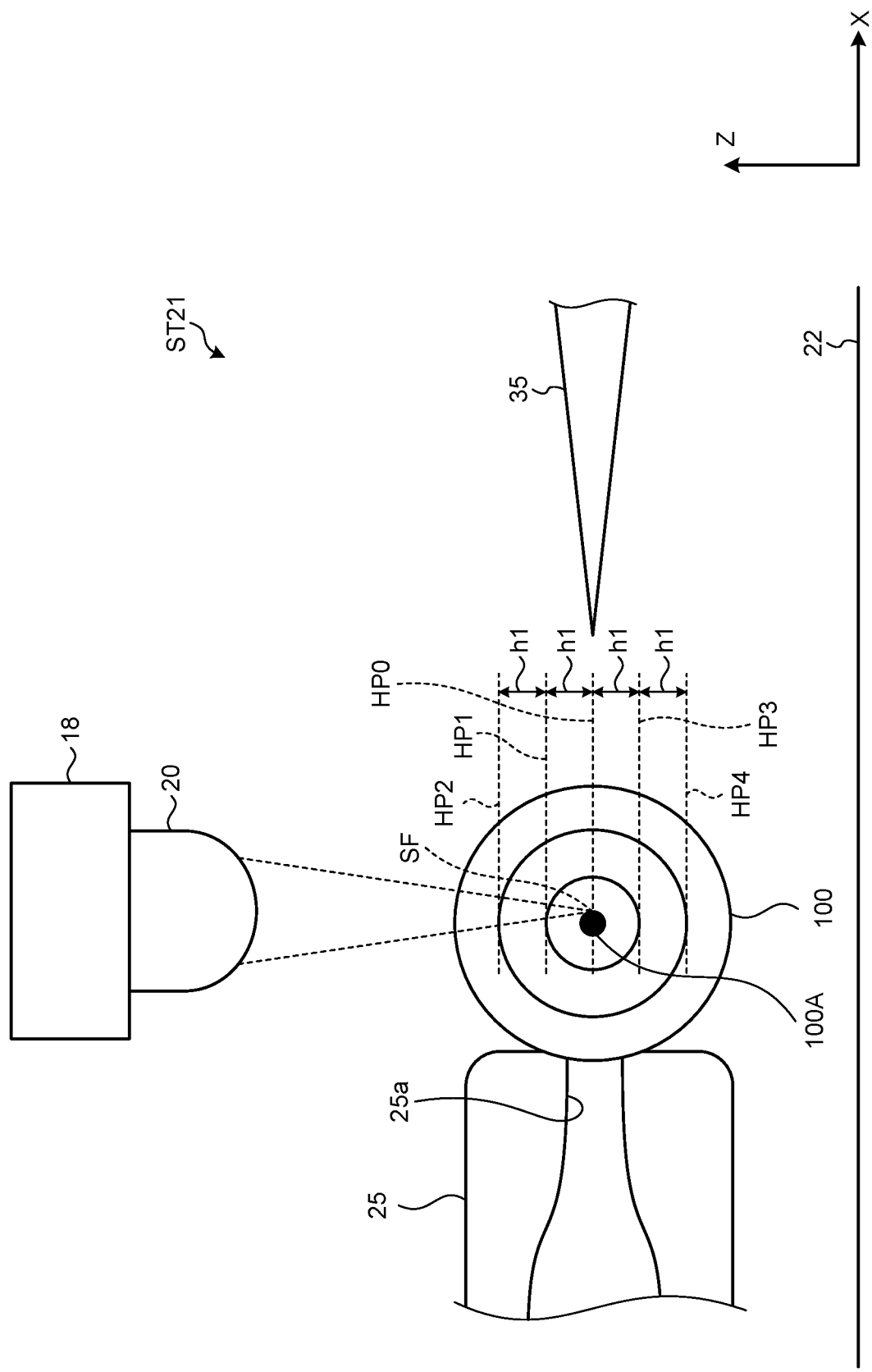
FIG. 6 is a schematic diagram illustrating a detection operation of the position of the nucleus in the cell by the manipulation system.

Next, a driving method of the manipulation system 10 will be described. FIG. 4 is a flowchart illustrating the driving method of the manipulation system of the embodiment. FIG. 5 is a schematic diagram of a cell and nuclei detected by image processing. FIG. 6 is a schematic diagram illustrating a detection operation of the position of the nucleus in the cell by the manipulation system.

The manipulation system 10 of the present embodiment performs, for a plurality of cells 100 placed on the sample holding member 11, manipulation for each cell 100 and repeatedly performs the manipulation on the multiple cells 100. The controller 43 performs the manipulation on the multiple cells 100 automatically. In the following description, the manipulation for one cell 100 will be explained. In this case, the cell 100 is an egg cell.

First, the operator prepares the sample holding member 11 such as a petri dish and the like, and places the cell 100 of the manipulation target on a certain position of the sample holding member 11. As illustrated in FIG. 1, the first pipette 25 and the second pipette 35 are arranged opposite to each other with an interval. The cell 100 is placed in the vicinity of the first pipette 25 and the second pipette 35.

The control unit 46A drives the syringe pump 29 (see FIG. 3) to perform suction by the first pipette 25. As a result, the pressure inside the first pipette 25 becomes negative, and a flow of a culture solution of the sample holding member 11 toward an opening 25a of the first pipette 25 arises. The cell 100 is sucked together with the culture solution and is held to the opening 25a (see FIG. 6) of the first pipette 25.

The control unit 46A moves the cell 100 held to the first pipette 25 to an imaging area IA (see FIG. 8) of the camera 18. Then, the control unit 46A images the cell 100 by the microscope unit 12 and acquires image data of the cell 100 (Step ST11).

Next, the control unit 46A compares a movement number n in the Z-axis direction of the first pipette 25 (Step ST12). In this case, the movement number n is the number of times the first pipette 25 is moved by a height pitch h1 (see FIG. 6) each to change the height positions HP0, HP1, HP2, HP3, and HP4 of the nucleus 100A. The movement number n is stored in the storage unit 46B.

When the movement number n is smaller than the movement end number Ne (n<Ne at Step ST12), the control unit 46A determines whether the movement number n is n=0 (Step ST13). The movement end number Ne is a predetermined number of times the first pipette 25 is moved in the Z-axis direction. The movement end number Ne is input from the input unit 49 and stored in the storage unit 46B. For example, the movement end number Ne is Ne=5 in FIG. 6. The movement end number Ne may be four or less or may be six or more. The movement end number Ne can be changed depending on the size of the cell 100, the height pitch h1, the image processing speed, and the like, for example.

When the movement number n is n=0 (Yes at Step ST13), the control unit 46A updates the movement number n to n=1 (Step ST13-1). Then, the control unit 46A detects the nucleus 100A of the cell 100 by image processing (Step ST14). Because the egg cell is translucent, as illustrated in the left diagram of FIG. 5, image data as if the cell 100 is sliced is obtained at a height in focus (focus position SF). On this image data, the image processor 43B performs image processing. The image processor 43B performs the above-described binarization processing and filter processing. As a result, as illustrated in the right diagram of FIG. 5, the image processor 43B outputs a monochrome image for which the color of the position corresponding to the nucleus 100A is different from the surroundings and performs edge extraction processing and pattern matching.

The control unit 46A determines whether the nucleus 100A was detected based on the result of image processing (Step ST15). When the nucleus 100A was detected (Yes at Step ST15), the position detector 43D detects, from the image processing result illustrated in the right diagram of FIG. 5, an area that is close to a circle and of a different color from the surroundings in an equal size corresponding to the nucleus 100A. As a result, the position detector 43D can detect the position of the nucleus 100A of the cell 100. The position of the detected nuclear 100A is stored in the storage unit 46B.

The control unit 46A executes, by the second pipette 35, an injection operation to the position of the nucleus 100A (Step ST16). Thereafter, the control unit 46A moves the first pipette 25 and the second pipette 35 to initial positions (Step ST17) and ends the detection of the position of the nucleus 100A and the injection operation.

When the nucleus 100A is not detected (No at Step ST15), the control unit 46A repeatedly executes the comparison steps (Step ST12, Step ST13) of movement number n. When the movement number n is smaller than the movement end number Ne (n<Ne at Step ST12) and the movement number n is not n=0 (No at Step ST13), the control unit 46A operates the first pipette 25 in the height direction (Step ST21).

As illustrated in FIG. 6, the control unit 46A moves the first pipette 25 by the height pitch h1 each and changes the height positions HP0, HP1, HP2, HP3, and HP4 of the nucleus 100A. For example, the control unit 46A moves the first pipette 25 in the Z-axis direction from the height position HP0 to the height position HP1. In the present specification, the height position of the first pipette 25 is the height in the Z-axis direction of the position at which a virtual line running through the center of the opening 25a intersects with the end face of the first pipette 25. The control unit 46A manipulates the cell 100 such that, by sequentially changing the height position of the first pipette 25, the position of the nucleus 100A coincides with the focus position SF of the microscope 20. The order of movement of the height positions HP0, HP1, HP2, HP3, and HP4 and the height pitch h1 can be adjusted as appropriate.

The control unit 46A updates the movement number n to n=+1 (Step ST22), after moving the first pipette 25 by the height pitch h1. Then, for each of the height positions HP0, HP1, HP2, HP3, and HP4 of the nucleus 100A, the above-described image processing and the detection processing of the nucleus 100A (Steps ST14, ST15) are repeatedly executed. When the nucleus 100A is detected before the movement end number Ne, the control unit 46A executes, by the second pipette 35, the injection operation to the position of the nucleus 100A (Step ST15). In this case, as illustrated in FIG. 6, moving the height position of the second pipette 35 to the height position of the nucleus 100A can execute the injection operation favorably.

Figure 7:
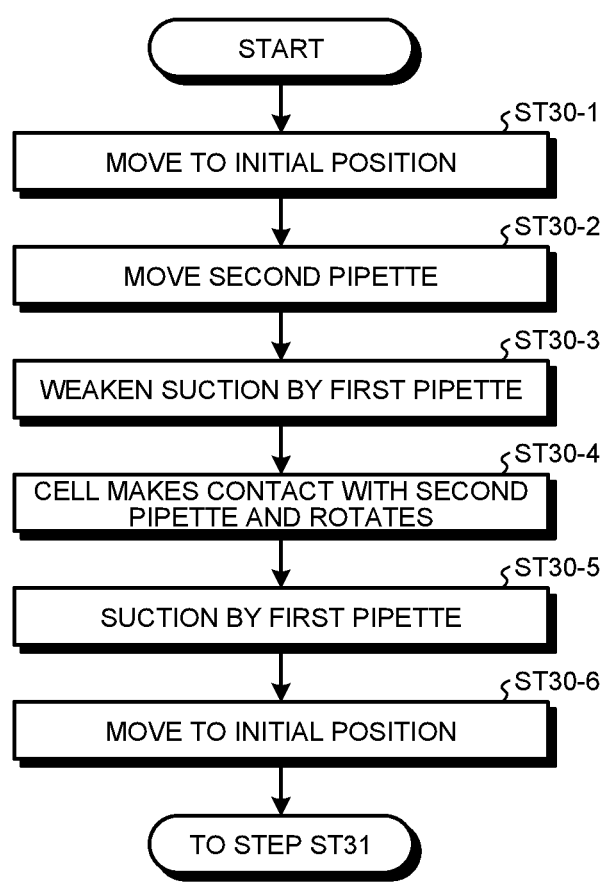
FIG. 7 is a flowchart illustrating a rotation operation of the cell by the manipulation system.
Figure 8:
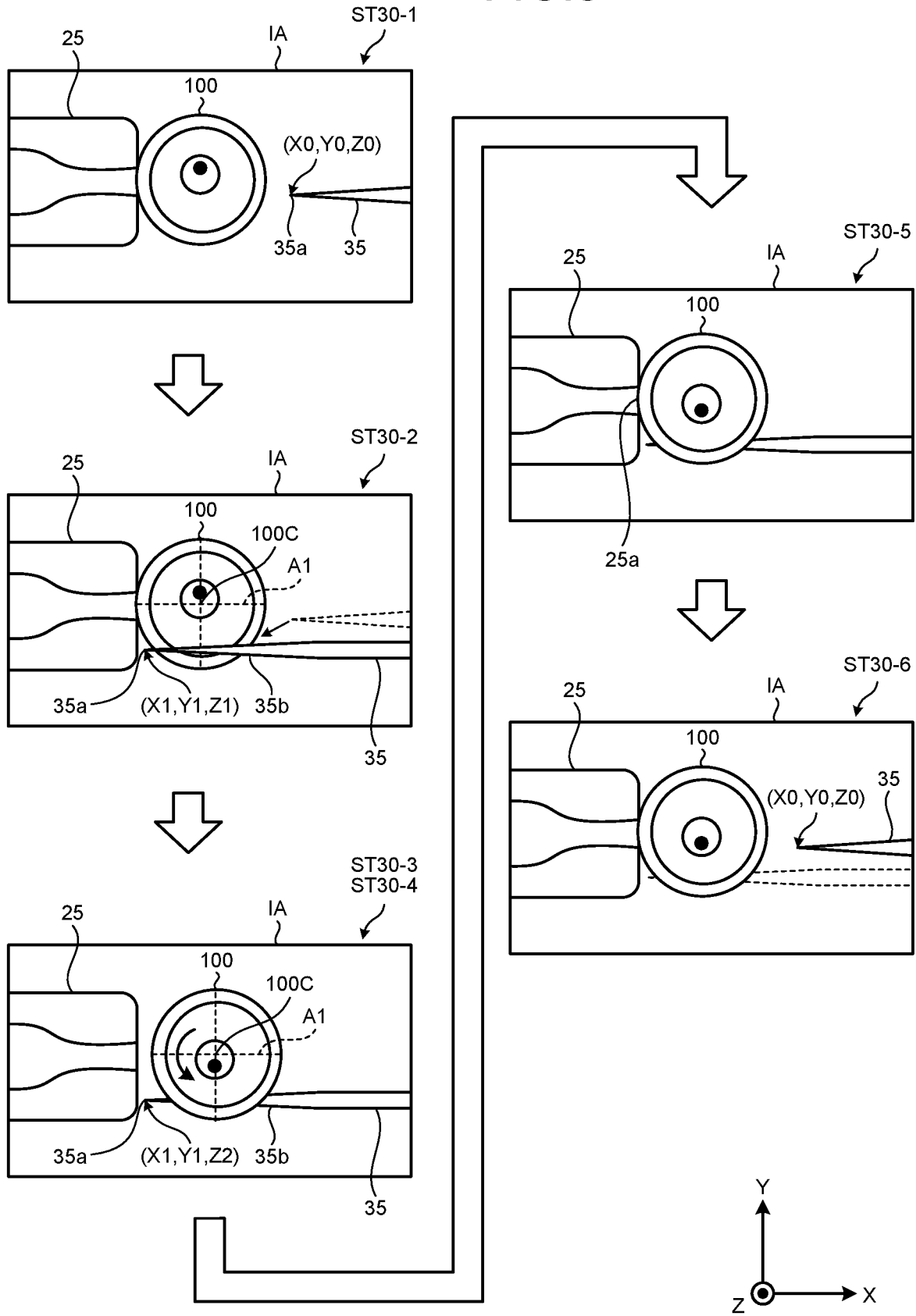
FIG. 8 is an explanatory diagram for explaining the rotation operation of the cell by the manipulation system.
Figure 9:
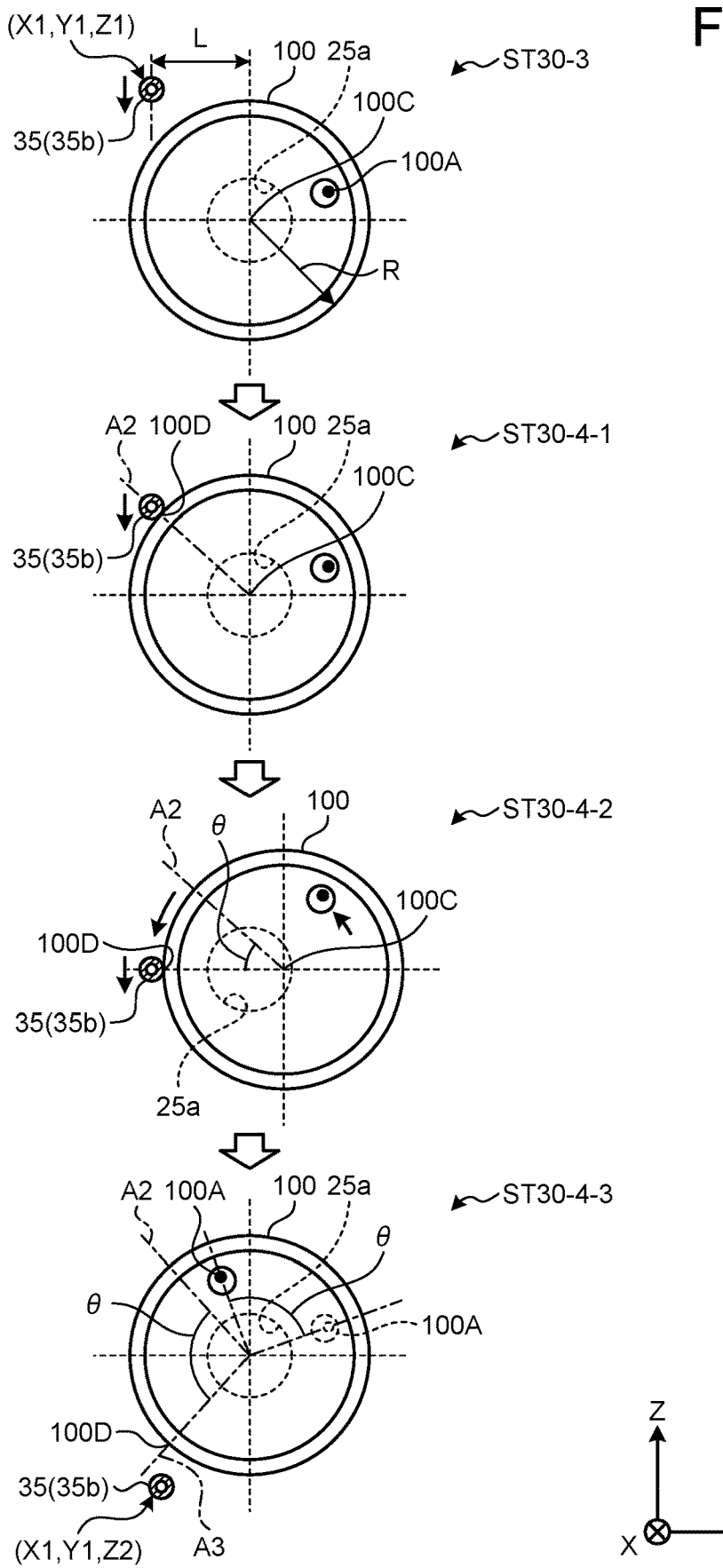
FIG. 9 is an explanatory diagram for explaining the rotation operation of the cell by the manipulation system.

When the movement number n reached the movement end number Ne (n=Ne at Step ST12), the control unit 46A executes a rotation operation of the cell 100 (Step ST30). FIG. 7 is a flowchart illustrating the rotation operation of the cell by the manipulation system. FIG. 8 and FIG. 9 are explanatory diagrams for explaining the rotation operation of the cell by the manipulation system. FIG. 8 is the explanatory diagram when the imaging area IA of the camera 18 is viewed from the Z-axis direction. FIG. 9 is the explanatory diagram when the cell 100 held to the first pipette 25 is viewed from the X-axis direction.

As illustrated in FIG. 7 and FIG. 8, the control unit 46A moves the first pipette 25 to move the cell 100 to the initial position (Step ST30-1). The position of a tip 35a of the second pipette 35 at this time is (X0, Y0, Z0). Next, the control unit 46A moves the second pipette 35 (Step ST30-2). As illustrated in FIG. 8, the second pipette 35 extends in the X-axis direction. The control unit 46A moves the second pipette 35 to the position where the second pipette 35 overlaps with the cell 100 and is away from a center 100C of the cell 100 in the Y-axis direction, when viewed from the Z-axis direction. The distance L (see FIG. 9) is the distance in the Y-axis direction between a shaft portion 35b of the second pipette 35 at this time and the center 100C of the cell 100. The tip 35a of the second pipette 35 is arranged outside the outer periphery of the cell 100 and at the position where the shaft portion 35b of the second pipette 35 overlaps with the cell 100, when viewed from the Z-axis direction. The position of the tip 53a of the second pipette 35 at this time is (X1, Y1, Z1).

Next, the control unit 46A controls the syringe pump 29 and weakens the suction by the first pipette 25 (Step ST30-3). As a result, the cell 100 slightly moves in a direction to be away from the first pipette 25. Alternatively, the cell 100 may be in contact with the opening 25a of the first pipette 25 so that the cell 100 can rotate. At this time, as illustrated in FIG. 9, the second pipette 35 is provided at a position where the second pipette 35 is not in contact with the cell 100.

The control unit 46A moves the second pipette 35 in a direction approaching the sample stage 22 from the upper side of the cell 100. As a result, the cell 100 comes in contact with the shaft portion 35b of the second pipette 35 and rotates (Step ST30-4). Specifically, as illustrated in FIG. 9, as the second pipette 35 moves downward, the second pipette 35 makes contact at a position 100D of the cell 100 (Step ST30-4-1). In this case, when viewed from the X-axis direction, a virtual line connecting the center 100C of the cell 100 and the position 100D is defined as a virtual line A2.

As the second pipette 35 moves further downward, a downward force is applied to the position 100D of the cell 100. At this time, by the first pipette 25, a suction force toward the center of the opening 25a is applied to the cell 100. Thus, the cell 100 moves to be pushed out in the Y-axis direction by the second pipette 35 while rotating with a direction that, as a central axis, runs through the center 100C and is parallel to the X-axis direction (Step ST30-4-2).

When the second pipette 35 moves further downward and away from the cell 100, the rotation of the cell 100 ends (Step ST30-4-3). The position of the tip 53a of the second pipette 35 at this time is (X1, Y1, Z2). Then, by the suction by the first pipette 25, the center 100C of the cell 100 moves such that the center 100C coincides with the center of the opening 25a. In this case, when viewed from the X-axis direction, a virtual line connecting the center 100C of the cell 100 and the position 100D when the second pipette 35 is away from the cell 100 is defined as a virtual line A3. The rotation angle θ of the cell 100 is an angle formed by the virtual line A2 and the virtual line A3. Due to the rotation of the cell 100, the nucleus 100A also rotates by the rotation angle θ with a direction that, as a central axis, runs through the center 100C and is parallel to the X-axis direction. In the manipulation system 10 of the present embodiment, the rotation angle θ of the cell 100 can be adjusted by the position 100D (length L) at which the second pipette 35 makes contact with the cell 100. If the radius of the cell 100 is R, when rotating by the rotation angle θ, the distance L is $L=R \cos(\theta/2)$.

After performing the rotation operation of the cell 100, the control unit 46A resumes the suction by the syringe pump 29, thereby making the pressure inside the first pipette 25 negative and performing sucking (Step ST30-5). As a result, the cell 100 is held to the first pipette 25. Thereafter, the second pipette 35 is moved to the position (X0, Y0, Z0) of the initial state (Step ST30-6).

Subsequently, as illustrated in FIG. 4, the control unit 46A resets the movement number n to n=0 (Step ST31). Then, the control unit 46A repeatedly executes the above-described image processing, the acquisition of the position coordinate of the nucleus 100A, and the operation of the height position of the first pipette 25, until the nucleus 100A is detected.

In the manipulation system 10, the control unit 46A performs these series of operations automatically. Thus, the manipulation system 10 can manipulate the cell 100 efficiently, regardless of the degree of skill and technique of the operator.

As in the foregoing, the manipulation system 10 includes the sample stage 22, the first manipulator 14, the second manipulator 16, the imaging unit (microscope unit 12), and the control unit 46A. The sample stage 22 is configured such that a minute object (cell 100) is placed thereon. The first manipulator 14 includes the first pipette 25 for holding the minute object. The second manipulator 16 includes the second pipette 35 for manipulating the minute object that is held to the first pipette 25. The imaging unit is configured to image the minute object. The control unit 46A is configured to control the sample stage 22, the first pipette 25, the second pipette 35, and the imaging unit. The control unit 46A moves the second pipette 35 to a direction approaching the sample stage 22 from the upper side of the minute object, at a position where the second pipette 35 overlaps with the minute object and is away from the center of the minute object in a direction orthogonal to the extending direction of the second pipette 35, when viewed from a direction perpendicular to the sample stage 22.

According to this, as the second pipette 35 moves in the height direction and makes contact with the minute object, the minute object rotates. Thus, even when the manipulation target position (position of the nucleus 100A) is not detected, the manipulation system 10 can detect the manipulation target position by performing the rotation operation of the minute object and changing the manipulation target position. In addition, because the rotation operation can be performed by the second pipette 35, the manipulation system 10 has no need for a dedicated device for the rotation operation of the minute object. As a result, the manipulation system 10 can detect the manipulation target position of the minute object in a simple configuration.

Furthermore, in the manipulation system 10, the tip 35a of the second pipette 35 is arranged outside the outer periphery of the minute object when viewed from the direction perpendicular to the sample stage 22, and the shaft portion 35b of the second pipette 35 is in contact with the minute object. According to this, in the rotation operation of the minute object, the tip 35a of the second pipette 35 does not come in contact with the minute object. Thus, the manipulation system 10 can prevent the damage of the minute object and the damage of the second pipette 35.

In the manipulation system 10, the control unit 46A detects the manipulation target position of the minute object based on the image data of the imaging unit, moves the second pipette 35 to the manipulation target position, and causes the second pipette 35 to perform manipulation on the minute object. According to this, because the control unit 46A detects the manipulation target position based on the image data, the manipulation target position can be detected regardless of the degree of skill of the operator. Furthermore, because the detection of the manipulation target position and the manipulation for the minute object are performed by the control unit 46A automatically, the manipulation system 10 can manipulate the minute object efficiently and suitably.

In the manipulation system 10, the control unit 46A operates the first pipette 25 in the height direction, and based on a plurality of image data of the minute object imaged for each different height position, detects the manipulation target position. According to this, the manipulation system 10 can accurately detect the manipulation target position.

Furthermore, the driving method of the manipulation system 10 includes a detection step (Step ST14) in which the control unit 46A detects the manipulation target position (position of the nucleus 100A) of the minute object (cell 100) held to the first pipette 25 based on the image data of the imaging unit (microscope unit 12) and a rotation step in which, when the manipulation target position is not detected at the detection step, the control unit 46A moves the second pipette 35 to a direction approaching the sample stage 22 from the upper side of the minute object, at a position where the second pipette 35 overlaps with the minute object and is away from the center 100C of the minute object in a direction (Y-axis direction) orthogonal to the extending direction (X-axis direction) of the second pipette 35, when viewed from a direction perpendicular to the sample stage 22 (Step ST30).

MODIFICATION

Figure 10:
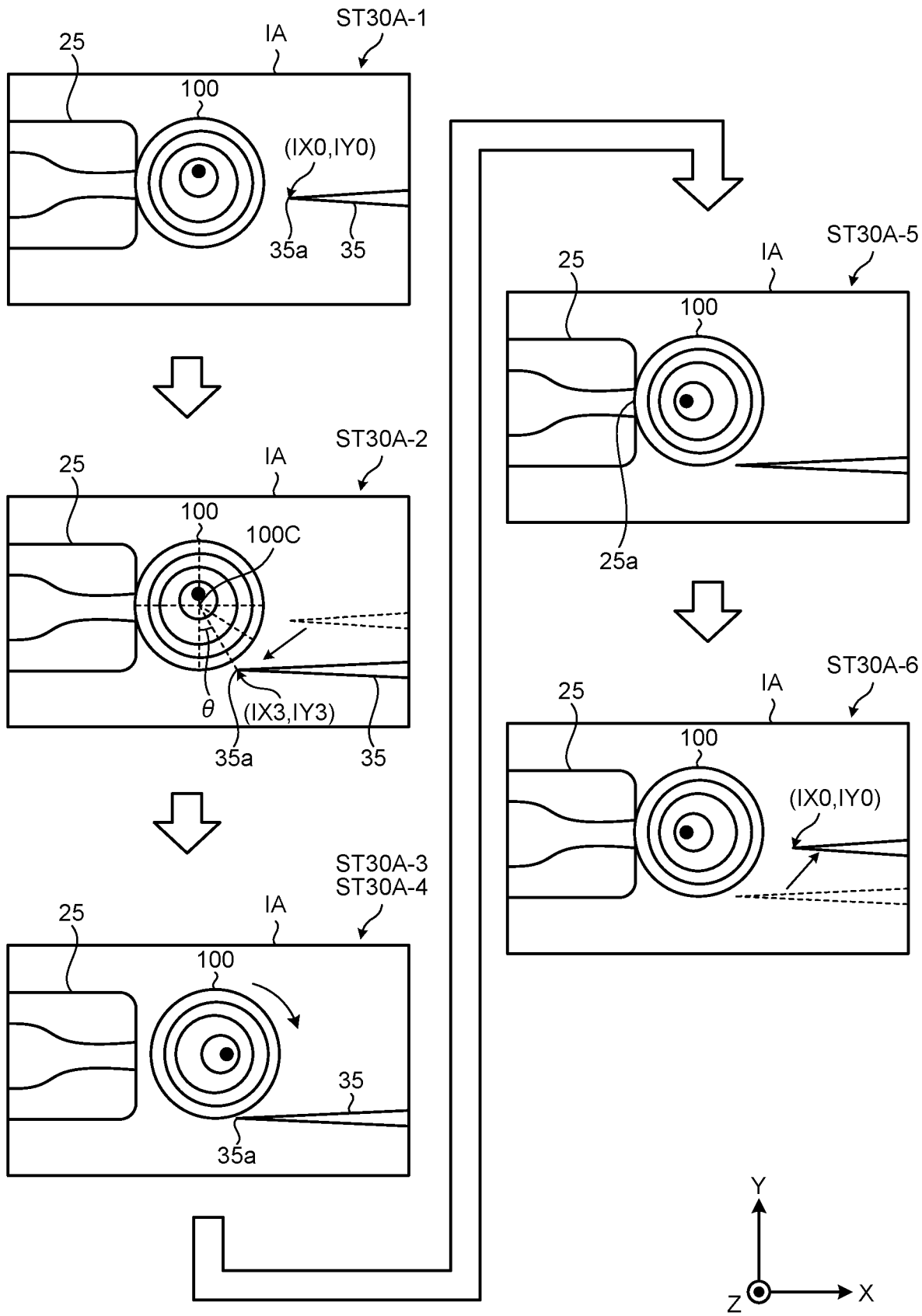
FIG. 10 is an explanatory diagram for explaining a modification of the rotation operation of the cell by the manipulation system.

FIG. 10 is an explanatory diagram for explaining a modification of the rotation operation of the cell by the manipulation system. In FIG. 8 and FIG. 9, the case in which the rotation operation of the cell 100 is performed with the direction parallel to the X-axis direction as a central axis has been described, but the rotation operation of the cell 100 can also be performed with a direction parallel to the Z-axis direction as a central axis.

As illustrated in FIG. 10, the control unit 46A moves the first pipette 25 and moves the cell 100 to the initial position (Step ST30A-1). At this time, the second pipette 35 is also returned to the position of the initial state. Next, the control unit 46A moves the second pipette 35 (Step ST30A-2). As a result, the tip 35a of the second pipette 35 is positioned from the coordinates (IX0, IY0) to the coordinates (IX3, IY3). The coordinates (IX3, IY3) are located in an area where the angle θ formed by the straight line running through the center 100C of the cell 100 and being parallel to the Y-axis and the straight line connecting the center 100C and the tip 35a of the second pipette 35 is 45° or less.

Next, the control unit 46A halts the syringe pump 29 and halts the suction by the first pipette 25 (Step ST30A-3). The control unit 46A may drive the first pipette 25 so that the pressure inside the first pipette 25 becomes slightly positive. As a result, the cell 100 slightly moves in a direction to be away from the first pipette 25. When the cell 100 moves, the cell 100 rotates as the cell 100 contacts the tip 35a of the second pipette 35 (Step ST30A-4). This operation enables the cell 100 to rotate within the X-Y plane. That is, the cell 100 rotates with a direction parallel to the Z-axis direction as a central axis. According to such operation, because the cell 100 rotates along with the movement of the cell 100, as compared with the case where the cell 100 is rotated by operating the second pipette 35, the damage of the cell 100 can be prevented.

After performing the rotation operation of the cell 100, the control unit 46A resumes the suction by the syringe pump 29, thereby making the pressure inside the first pipette 25 negative and performing sucking (Step ST30A-5). As a result, the cell 100 is held to the first pipette 25. Thereafter, the second pipette 35 is moved to the position (IX0, IY0) of the initial state (Step ST30A-6). Subsequently, the control unit 46A repeatedly executes the image processing illustrated in FIG. 4, the acquisition of the position coordinate of the nucleus 100A, and the operation of the height position of the first pipette 25, until the nucleus 100A is detected.

The manipulation system 10 and the driving method of the manipulation system 10 of the present embodiment and the modification may be modified as appropriate. For example, it is preferable that the shapes and the like of the first pipette 25, the second pipette 35, and the like be changed as appropriate, depending on the type of the minute object and the operation for the minute object. In the respective operations of the cell holding operation, the nucleus detection operation, the injection operation, and the cell placement operation, as appropriate, a part of the procedure may be omitted, or the procedure may be replaced and executed.

REFERENCE SIGNS LIST

10 MANIPULATION SYSTEM
11 SAMPLE HOLDING MEMBER
12 MICROSCOPE UNIT
14 FIRST MANIPULATOR
16 SECOND MANIPULATOR
18 CAMERA
20 MICROSCOPE
22 SAMPLE STAGE
24 FIRST PIPETTE HOLDING MEMBER
25 FIRST PIPETTE
26, 36 X-Y AXIS TABLE
28, 38 Z-AXIS TABLE
30, 32, 40, 42 DRIVE DEVICE
34 SECOND PIPETTE HOLDING MEMBER
35 SECOND PIPETTE
35a TIP
35b SHAFT PORTION
43 CONTROLLER
44 MICRO-MOTION MECHANISM
46A CONTROL UNIT
100 CELL
100A NUCLEUS
100C CENTER

The invention claimed is:
1. A manipulation system comprising:
a sample stage configured such that a minute object is placed thereon;
a first manipulator including a first pipette for holding the minute object;
a second manipulator including a second pipette for manipulating the minute object that is held to the first pipette;
an imaging unit configured to image the minute object from an upper side of the minute object in a direction perpendicular to the sample stage; and
a control unit configured to control the sample stage, the first pipette, the second pipette, and the imaging unit, wherein
the control unit moves the second pipette to a direction approaching the sample stage from the upper side of the minute object, at a position where the second pipette overlaps with the minute object and is away from a center of the minute object in a direction orthogonal to an extending direction of the second pipette, when viewed from the direction perpendicular to the sample stage; and
when viewed from the direction perpendicular to the sample stage:
a tip of the second pipette is arranged between the minute object and the first pipette;
the minute object is disposed between the tip of the second pipette and an end of the second pipette, the end being opposite to the tip of the second pipette;
a shaft portion of the second pipette is in contact with the minute object,
the second pipette moves further downward to allow the minute object to rotate around a central axis and to be pushed out in a direction crossing the central axis, the central axis going through a center of the minute object and being parallel to the extending direction of the second pipette; and
the second pipette moves further downward and away from the minute object, and the minute object moves in a direction approaching the first pipette and is held due to being sucked by the first pipette.

2. The manipulation system according to claim 1, wherein the control unit detects a manipulation target position of the minute object based on image data of the imaging unit, moves the second pipette to the manipulation target position, and causes the second pipette to perform manipulation for the minute object.

3. The manipulation system according to claim 1, wherein the control unit operates the first pipette in a height direction, and based on a plurality of image data of the minute object imaged for each different height position, detects the manipulation target position of the minute object.

4. A driving method of a manipulation system that includes a sample stage configured such that a minute object is placed thereon, a first manipulator including a first pipette for holding the minute object, a second manipulator including a second pipette for manipulating the minute object that is held to the first pipette, an imaging unit configured to image the minute object from an upper side of the minute object in a direction perpendicular to the sample stage, and a control unit configured to control the sample stage, the first pipette, the second pipette, and the imaging unit, the driving method comprising:

a detection step in which the control unit detects a manipulation target position of the minute object that is held to the first pipette based on image data of the imaging unit; and a rotation step in which, when the manipulation target position is not detected at the detection step, the control unit moves the second pipette to a direction approaching the sample stage from the upper side of the minute object, at a position where the second pipette overlaps with the minute object and is away from a center of the minute object in a direction orthogonal to an extending direction of the second pipette, when viewed from the direction perpendicular to the sample stage, wherein, when viewed from the direction perpendicular to the sample stage:

a tip of the second pipette is arranged between the minute object and the first pipette;

the minute object is disposed between the tip of the second pipette and an end of the second pipette, the end being opposite to the tip of the second pipette;

a shaft portion of the second pipette is in contact with the minute object, the second pipette moves further downward to allow the minute object to rotate around a central axis and to be pushed out in a direction crossing the central axis, the central axis going through a center of the minute object and being parallel to the extending direction of the second pipette; and the second pipette moves further downward and away from the minute object, and the minute object moves in a direction approaching the first pipette and is held due to being sucked by the first pipette.

* * * * *